(12) United States Patent
Koganehira et al.

(10) Patent No.: US 8,137,448 B2
(45) Date of Patent: *Mar. 20, 2012

(54) INK COMPOSITION FOR INK JET RECORDING

(75) Inventors: Shuichi Koganehira, Matsumoto (JP); Akira Mizutani, Matsumoto (JP); Hironori Sato, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/600,279

(22) PCT Filed: May 14, 2008

(86) PCT No.: PCT/JP2008/058848
§ 371 (c)(1),
(2), (4) Date: May 13, 2010

(87) PCT Pub. No.: WO2008/143086
PCT Pub. Date: Nov. 27, 2008

(65) Prior Publication Data
US 2010/0289848 A1 Nov. 18, 2010

(30) Foreign Application Priority Data

| | | |
|---|---|---|
| May 14, 2007 | (JP) | 2007-128152 |
| Sep. 18, 2007 | (JP) | 2007-241158 |
| Feb. 8, 2008 | (JP) | 2008-029540 |
| May 13, 2008 | (JP) | 2008-125964 |

(51) Int. Cl.
*C09D 11/02* (2006.01)

(52) U.S. Cl. ............ 106/31.58; 106/31.59; 106/31.86; 106/31.89

(58) Field of Classification Search ............ 106/31.58, 106/31.59, 31.86, 31.89; 427/256, 288; 347/100
See application file for complete search history.

(56) References Cited

U.S. PATENT DOCUMENTS

| | | | |
|---|---|---|---|
| 7,462,231 B2 | 12/2008 | Koganehira et al. | |
| 7,494,538 B2 | 2/2009 | Koganehira et al. | |
| 7,537,652 B2 | 5/2009 | Koganehira et al. | |
| 7,686,876 B2 | 3/2010 | Koganehira et al. | |
| 7,871,466 B2 | 1/2011 | Koganehira et al. | |
| 2005/0190244 A1* | 9/2005 | Tyrell | 347/100 |
| 2005/0284332 A1* | 12/2005 | Shinjo et al. | 106/31.58 |
| 2006/0264535 A1* | 11/2006 | Oyanagi et al. | 523/160 |
| 2007/0112095 A1* | 5/2007 | Moribe et al. | 523/160 |
| 2007/0242118 A1* | 10/2007 | Koganehira et al. | 106/31.86 |
| 2007/0247504 A1* | 10/2007 | Koganehira et al. | 106/31.58 |
| 2007/0266887 A1 | 11/2007 | Koganehira et al. | |
| 2009/0176071 A1 | 7/2009 | Koganehira et al. | |
| 2009/0297716 A1* | 12/2009 | Koganehira et al. | 427/288 |
| 2009/0297790 A1 | 12/2009 | Sato et al. | |
| 2009/0308279 A1 | 12/2009 | Koganehira et al. | |
| 2010/0010121 A1 | 1/2010 | Koganehira et al. | |
| 2010/0080962 A1 | 4/2010 | Koganehira et al. | |
| 2010/0086685 A1* | 4/2010 | Mizutani et al. | 427/256 |
| 2010/0289848 A1 | 11/2010 | Koganehira et al. | |

FOREIGN PATENT DOCUMENTS

| | | |
|---|---|---|
| JP | 2003-012583 A | 1/2003 |
| JP | 2003-213179 A | 7/2003 |
| JP | 2003-253167 A | 9/2003 |
| JP | 2005-194500 A | 7/2005 |
| JP | 2005-248178 A | 9/2005 |
| JP | 2005-298813 A | 10/2005 |
| JP | 2006-104244 A | 4/2006 |
| JP | 2006-249429 A | 9/2006 |
| JP | 2006-307137 A | 11/2006 |
| JP | 2007-146127 A | 6/2007 |
| JP | 2007-297595 A | 11/2007 |
| JP | 2007-297596 A | 11/2007 |
| WO | 2007058245 A1 | 5/2007 |
| WO | 2008143086 A1 | 11/2008 |

OTHER PUBLICATIONS

International Search Report dated Aug. 12, 2008 for PCT Application No. PCT/JP2008/058848.
English Translation of International Preliminary Report on Patentability issued Dec. 3, 2009 in the corresponding PCT application.

* cited by examiner

*Primary Examiner* — Helene Klemanski
(74) *Attorney, Agent, or Firm* — Nutter McClennen & Fish LLP; John J. Penny, Jr.

(57) ABSTRACT

There is provided an ink composition that can realize high-quality images free from white streaks or roughness even in low resolution when printing paper for running-on such as art paper is used. The ink composition comprises at least a colorant, water, an alcohol solvent, and a surfactant, wherein the alcohol solvent comprises a sparingly water soluble alkanediol, a water soluble alkanediol, and a water soluble alkanetriol.

26 Claims, No Drawings

INK COMPOSITION FOR INK JET RECORDING

BACKGROUND OF THE INVENTION

1. Field of Invention

The present invention relates to an ink composition for ink jet recording that can produce print mottle-free and high-quality recorded matters on various recording media, especially even on recording media having a low level of water absorption such as synthetic papers and printing papers for running-on.

2. Background Art

Ink jet recording is a printing method wherein droplets of an ink are ejected and deposited on recording media, such as paper, to perform printing. An innovative advance of a recent ink jet recording technique has made it possible to realize the production of images having quality comparable to images produced by silver salt photography or images yielded by high-definition printing realized only by offset printing. This trend has led to the development of inks for ink jet recording that can realize images having a high level of glossy impression comparable to the gloss of images produced by silver salt photography, using the so-called specialty papers that are recording media having a high level of gloss comparable to photographic paper, art paper and the like used in the field of silver salt photography and offset printing. Further, inks for ink jet recording that can realize image quality comparable to the image quality of images produced by silver salt photography even on plain paper have also been developed.

The widespread use of techniques for forming images from digital data in recent years has led to an increased need for digital color proofs (DTPs) particularly in the field of printing, and an ink jet recording method has also become applied to DTPs. The color reproduction and stability reproduction of printed matters are required of DTPs. Accordingly, when proofs are prepared by the ink jet recording method, specialty paper for ink jet recording has been generally used.

In applications for color proof, however, ink jet recording on printing paper for running-on rather than specialty papers has been desired. Further, when prints produced by ink jet recording directly on printing paper for running-on without use of specialty papers can be used as a final proof sample, it is considered that proof cost can be significantly reduced. Furthermore, synthetic papers, which are widely used in the field of printing and are produced by mixing a polyethylene resin or a polyester resin, for example, with an inorganic filler and forming the mixture into a film, have recently drawn attention as materials that have excellent recyclability and are environmentally friendly.

The printing paper for running-on is a coated paper having on its surface a coating layer for receiving an oil-based ink. In the printing paper for running-on, however, the capability of the coating layer to absorb ink is disadvantageously poor. Therefore, when water-based pigment inks, which have been generally used in ink jet recording, are used, the penetrability of the inks into recording media (printing paper for running-on) is so low that feathering or bleeding or uneven coagulation sometimes occurs in images.

In order to solve the problems, for example, Japanese Patent Application Laid-Open No. 194500/2005 (patent document 1) discloses a pigment-based ink that can yield images having reduced feathering or bleeding and, at the same time, having excellent gloss on specialty papers by using a polysiloxane compound as a surfactant and adding an alkanediol such as 1,2-hexanediol as a solubilizer. Further, Japanese Patent Application Laid-Open No. 213179/2003 (patent document 2) proposes that a high-quality image is produced by adding a water soluble organic solvent such as glycerin or 1,3-butanediol to ink to regulate the penetration of the ink into recording media.

SUMMARY OF THE INVENTION

The present inventors have found that the addition of a surfactant such as polysiloxane and an alkanediol to ink can reduce the occurrence of ink coagulation spots when the ink is printed on printing paper for running-on at a low resolution, but on the other hand, images having white streaks or a roughness feeling are formed when printing is performed at a low resolution. The present inventors have further found that the addition of a specific alkanetriol in addition to the above ingredients can realize the formation of images free from white streaks or a roughness feeling even when the ink is printed at a low resolution. The present invention has been made based on such finding.

Accordingly, an object of the present invention is to provide an ink composition that can realize high-quality images free from white streaks or a roughness feeling even when printing is performed on printing paper for running-on such as art paper at a low resolution.

According to the present invention, there is provided an ink composition for ink jet recording, comprising at least a colorant, water, an alcohol solvent, and a surfactant, wherein the alcohol solvent comprises a sparingly water soluble alkanediol, a water soluble alkanediol, and a water soluble alkanetriol.

According to the present invention, high-quality images free from white streaks or a roughness feeling can be provided even when printing is performed on printing paper for running-on such as art paper at a low resolution.

DETAILED DESCRIPTION OF THE INVENTION

The ink composition for ink jet recording according to the present invention comprises at least a colorant, water, an alcohol solvent, and a surfactant, wherein the alcohol solvent comprises a sparingly water soluble alkanediol, a water soluble alkanediol, and a water soluble alkanetriol. The individual ingredients will be described.

<Definition>

The alkanediol and the alkanetriol used herein may be of a straight chain or branched chain type.

The term "water soluble" means that the solubility in water (amount of solute based on 100 g of water) is not less than 10.0 g, and the term "sparingly soluble" means that the solubility in water (amount of solute based on 100 g of water) is less than 1.0 g.

<Alcohol Solvent>

The alcohol solvent used in the ink composition for ink jet recording according to the present invention comprises at least three types of organic solvents including a sparingly water soluble alkanediol, a water soluble alkanediol, and a water soluble alkanetriol. The incorporation of the three types of alcohol solvents as indispensable ingredients in the ink composition can suppress ink coagulation upon printing on printing paper for running-on, especially art paper, paper for POD (print on demand) applications (for example, Ricoh business coat gloss 100, manufactured by Ricoh Company, Ltd.), specialty papers for laser printers (for example, LPC-CTA4, manufactured by SEIKO EPSON CORPORATION), which have a relatively high ink absorbing capability, and can realize high-quality images free from white streaks or a roughness feeling even when printing is performed at a low resolution. The term "coagulation" as used herein refers to local density spot formation (occurrence of unevenness in density) of similar colors when a blotted image is printed (for example, when an area of 6 inch square is printed with a single color (this does not mean the number of ink colors)). The coagulation does not mean that the surface of the recording medium has portions remaining uncovered with the ink. The term "white streaks" as used herein refers to such a phenomenon that, upon printing of a blotted image (for example, printing on an area of 6 inch square with a single color), local color density spot formation of similar colors is not observed and portions remaining uncovered with the ink exist in a streak form on the surface of the recording medium in the driving direction of the recording head. The term "roughness feeling" or "filling failure" refers to such a phenomenon that, upon printing of a blotted image as described above, local color density spot formation of similar colors is not observed, portions remaining uncovered with the ink stay on the surface of the recording medium, and the surfaces of the recording medium has a rough granular feeling.

The reason why, as described above, the addition of a water soluble alkanetriol in addition to the water soluble alkanediol and the water soluble alkanediol as the indispensable ingredients can realize high-quality images free from white streaks or a roughness feeling has not been fully elucidated yet, but is believed to be as follows.

It is considered that ink coagulation occurs upon recording on printing paper for running-on because ink is repelled from the printing paper for running-on due to a high surface tension of ink dots and a high contact angle between the surface of the printing paper for running-on and the ink droplets. Even when white streaks or a filling failure occurs upon recording at a low resolution, ink coagulation can be suppressed by reducing the surface tension of the ink deposited on the surface of the printing paper for running-on.

The following phenomenon is considered to be causative of the occurrence of the white streaks or the filling failure upon recording at a low resolution. Specifically, an ink dot deposited on the surface of the printing paper for running-on comes into contact with an adjacent ink dot, and the ink dots are mutually wetted and spread. As a result, undried inks flow into each other. This is considered to cause the white streaks or the filling failure. The flow of undried inks into each other is possibly derived from the difference in drying time from ink dot to ink dot, for example, by the difference in deposition time between adjacent ink dots or the size of ink droplets in the deposition of the ink. Accordingly, it is considered that, from the viewpoint of realizing high-quality images free from white streaks or a roughness feeling, even when the ink coagulation is suppressed and printing is performed at a low resolution, the deposition of an ink having a low surface tension and a low fluidity on the printing paper for running-on is preferred.

However, it is considered that, when any penetrable lubricant is not used from the viewpoint of lowering the fluidity of ink, the speed of drying of ink dots deposited on the surface of the printing paper for running-on and the speed of ink absorption are accelerated and, consequently, the time necessary for mutual wetting and spreading of the deposited ink dots is lost, resulting in the occurrence of white streaks or the filling failure upon recording at a low resolution.

The water soluble alkanetriol used in the present invention is a viscous substance such as glycerin. The water soluble alkanetriol is a penetrable lubricant having a lower surface tension than glycerin. For example, the surface tension of 1,2,6-hexanetriol as a 10% aqueous solution is 54 mN/m, and the surface tension of 3-methylpentane-1,3,5-triol (manufactured by TOKYO CHEMICAL INDUSTRY CO., LTD., CAS: 7564-64-9) as a 10% aqueous solution is 49 mN/m.

In the present invention, alkanediols having 7 or more carbon atoms are preferred as the sparingly water soluble alkanediol, and examples thereof include 1,2-heptanediol, 1,2-octanediol, 5-methyl-1,2-hexanediol, 4-methyl-1,2-hexanediol, and 4,4-dimethyl-1,2-pentanediol. Among them, 1,2-octanediol is more preferred.

Alkanediols having 6 or less carbon atoms are preferred as the water soluble alkanediol, and examples thereof include 1,2-hexanediol, 1,2-pentanediol, 1,2-butanediol, 4-methyl-1,2-pentanediol, and 3,3-dimethyl-1,2-butanediol. Among them, water soluble alkanediols having a surface tension of not more than 28 mN/m as a 15% aqueous solution are more preferred, and 1,2-hexanediol (surface tension: 26.7 mN/m), 4-methyl-1,2-pentanediol (surface tension: 25.4 mN/m), and 3,3-dimethyl-1,2-butanediol (surface tension: 26.1 mN/m) are particularly preferred. 1,2-Hexanediol is preferred from the viewpoint of odor during printing.

Alkanetriols having a main chain with 5 or more carbon atoms are preferred as the water soluble alkanetriol, and examples thereof include 1,2,6-hexanetriol or 3-methylpentane-1,3,5-triol. Among them, 1,2,6-hexanetriol is preferred particularly from the viewpoint of intermittent printability of ink, and 3-methylpentane-1,3,5-triol is preferred from the viewpoint of ink fixation.

In the three types of alcohol solvents, the content ratio of the sparingly water soluble alkanediol to the water soluble alkanediol is preferably 1:1 to 1:6, more preferably 1:1 to 1:3. When the content ratio falls within the above-defined range, the sparingly water soluble alkanediol can be stably dissolved in the ink and, in its turn, the ejection stability is improved. On the other hand, when the content ratio of the water soluble alkanediol is above the upper limit of the above-defined content range, a reduction in the initial viscosity of the ink and a reduction in coagulation spots cannot be simultaneously realized without difficulties. When the content ratio of the water soluble alkanediol is below the lower limit of the above-defined content range, the sparingly water soluble alkanediol cannot be stably dissolved in the ink without difficulty and, consequently, suppressing a change in viscosity over time and maintaining the storage stability are difficult.

The content ratio of the sparingly water soluble alkanediol to the water soluble alkanetriol is preferably 1:1 to 1:8, more preferably 1:1 to 1:6. When the content ratio is in the above-defined range, the initial viscosity of the ink can be lowered and, at the same time, good recovery from clogging can be realized. On the other hand, when the content ratio of the water soluble alkanetriol is above the upper limit of the above-defined content range, the initial viscosity of the ink is increased and the drying property is lowered. When the content ratio of the water soluble alkanetriol is below the lower limit of the above-defined content range, the recovery from clogging is deteriorated and, due to increased drying properties, the time necessary for wetting and spreading of the ink cannot be ensured. In this case, the ink cannot cover the recording medium, and white streaks are likely to occur.

The content ratio of the water soluble alkanediol to the water soluble alkanetriol is preferably 2:1 to 1:18, more preferably 1:1 to 1:3. When the content ratio is in the above-defined range, the occurrence of white streaks or a roughness feeling can be more effectively suppressed when printing is performed at a low resolution on the printing paper for running-on. On the other hand, when the content ratio of the water soluble alkanetriol is above the upper limit of the above-defined content range, the initial viscosity of the ink is increased and the drying property is lowered. When the content ratio of the water soluble alkanetriol is below the lower limit of the above-defined content range, the recovery from clogging is deteriorated and, due to increased drying properties, the time necessary for wetting and spreading of the ink cannot be ensured. In this case, the ink cannot cover the recording medium, and white streaks are likely to occur.

The content of the sparingly water soluble alkanediol is preferably 1 to 3% by weight, more preferably 1.5 to 2.5% by weight, based on the whole ink composition. When the content of the sparingly water soluble alkanediol is less than 1% by weight, print mottles sometimes occur upon printing on a recording medium having a low ink absorbing capability such as printing paper for running-on. On the other hand, when the content of the sparingly water soluble alkanediol is more than 3% by weight, in some cases, the sparingly water soluble alkanediol cannot be completely dissolved in the ink.

The content of the water soluble alkanediol is preferably 1 to 6% by weight, more preferably 1.5 to 4.5% by weight. When the content of the water soluble alkanediol is less than 1% by weight, in some case, the sparingly water soluble alkanediol cannot be dissolved in the ink. On the other hand, when the content of the water soluble alkanediol is more than 6% by weight, in some cases, the initial viscosity of the ink is disadvantageously increased.

The content of the water soluble alkanetriol is preferably 3 to 18% by weight, more preferably 5 to 15% by weight, based on the whole ink composition. When the content of the water soluble alkanetriol is less than 3% by weight, white streaks or a roughness feeling sometimes occurs when printing is performed on printing paper for running-on at a low resolution. On the other hand, when the content of the water soluble alkanetriol is more than 18% by weight, the drying property of the printed matter immediately after printing is sometimes deteriorated.

<Colorant>

Any of dyes and pigments may be used as the colorant in the ink composition for ink jet recording according to the present invention. However, pigments are preferred from the viewpoints of lightfastness and waterfastness.

Inorganic pigments and organic pigments are usable as the pigment. The inorganic pigments and the organic pigments may be used either solely or as a mixture of two or more. Inorganic pigments include, for example, in addition to titanium oxide and iron oxide, carbon blacks produced by known processes, such as contact, furnace, and thermal processes. Organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophlalone pigments), dye-type chelate pigments (for example, basic dye-type chelate pigments and acid dye-type chelate pigments), nitro pigments, nitroso pigments, and aniline blacks.

Pigments used may be properly selected depending upon the type (color) of the ink composition to be prepared. Examples of pigments for yellow ink compositions include C.I. Pigment Yellow 1, C.I. Pigment Yellow 2, C.I. Pigment Yellow 3, C.I. Pigment Yellow 12, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 128, C.I. Pigment Yellow 129, C.I. Pigment Yellow 138, C.I. Pigment Yellow 139, C.I. Pigment Yellow 147, C.I. Pigment Yellow 150, C.I. Pigment Yellow 151, C.I. Pigment Yellow 154, C.I. Pigment Yellow 155, C.I. Pigment Yellow 180, and C.I. Pigment Yellow 185. They may be used either solely or in a combination of two or more. The use of one or at least two pigments selected from the group consisting of C.I. Pigment Yellow 74, C.I. Pigment Yellow 110, C.I. Pigment Yellow 128, and C.I. Pigment Yellow 147 is particularly preferred. Examples of pigments for magenta ink compositions include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 168, C.I. Pigment Red 184, C.I. Pigment Red 202, C.I. Pigment Red 209; and C.I. Pigment Violet 19. They may be used either solely or in a combination of two or more. The use of one or at least two pigments selected from the group consisting of C.I. Pigment Red 122, C.I. Pigment Red 202, C.I. Pigment Red 209, and C.I. Pigment Violet 19 is particularly preferred. Examples of pigments for cyan ink compositions include C.I. Pigment Blue 1, C.I. Pigment Blue 2, C.I. Pigment Blue 3, C.I. Pigment Blue 15:3, C.I. Pigment Blue 15:4, C.I. Pigment Blue 15:34, C.I. Pigment Blue 16, C.I. Pigment Blue 22, and C.I. Pigment Blue 60; and C.I. Vat Blue 4 and C.I. Vat Blue 60. They may be used either solely or in a combination of two or more. The use of C.I. Pigment Blue 15:3 and/or C.I. Pigment Blue 15:4 is particularly preferred. C.I. Pigment Blue 15:3 is still more preferred.

Examples of pigments for black ink compositions include inorganic pigments, for example, carbon blacks (C.I. Pigment Black 7) such as furnace black, lamp black, acetylene black, and channel black and iron oxide pigments; and organic pigments, for example, aniline black (C.I. Pigment Black 1). Among them, carbon blacks are preferred in the present invention. Specific examples of carbon blacks include #2650, #2600, #2300, #2200, #1000, #980, #970, #966, #960, #950, #900, #850, MCF-88, #55, #52, #47, #45, #45L, #44, #33, #32, and #30 (these products being manufactured by Mitsubishi Chemical Corporation), Special Blaek 4A and Special Blaek 550, Printex 95, Printex 90, Printex 85, Printex 80, Printex 75, Printex 45, and Printex 40 (these products being manufactured by Degussa Corporation), Regal 660, Rmogul L, Monarch 1400, Monarch 1300, Monarch 1100, Monarch 800, and Monarch 900 (these products being manufactured by Cabot Corporation), and Raven 7000, Raven 5750, Raven 5250, Raven 3500, Raven 3500, Raven 2500 ULTRA, Raven 2000, Raven 1500, Raven 1255, Raven 1200, Raven 1190 ULTRA, Raven 1170, Raven 1100 ULTRA, Raven 5000 UIII, (these products being manufactured by Columbian Corporation).

The concentration of the pigment may be regulated to a proper pigment concentration (content) in the preparation of the ink composition and thus is not particularly limited. The concentration of the pigment, however, is generally 5 to 20% by weight.

Preferably, the pigment has been kneaded with a dispersant, which will be described later, from the viewpoints of simultaneously satisfying color image gloss, bronzing prevention, and ink composition storage stability requirements and, at the same time, forming color images having better gloss.

<Dispersant>

The ink composition according to the present invention preferably comprises at least one resin, which is selected from styrene-acrylic acid copolymer resins, urethane resins, and fluorene resins, as a dispersant for dispersing the colorant. The copolymer resin is adsorbed to a pigment to improve the dispersibility of the pigment.

In the copolymer resins, specific examples of hydrophobic monomers include methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, sec-butyl acrylate, sec-butyl methacrylate, tert-butyl acrylate, tert-butyl methacrylate, n-hexyl acrylate, n-hexyl methacrylate, n-octyl acrylate, n-octyl methacrylate, iso-octyl acrylate, iso-octyl methacrylate, 2-ethylhexyl acrylate, 2-ethylhexyl methacrylate, decyl acrylate, decyl methacrylate, lauryl acrylate, lauryl methacrylate, stearyl acrylate, stearyl methacrylate, 2-hydroxyethyl acrylate, 2-hydroxyethyl methacrylate, 2-hydroxypropyl acrylate, 2-hydroxypropyl methacrylate, 2-dimethylaminoethyl acrylate, 2-dimethylaminoethyl methacrylate, 2-diethylaminoethyl acrylate, 2-diethylaminoethyl methacrylate, glycidyl acrylate, glycidyl methacrylate, allyl acrylate, allyl methacrylate, cyclohexyl acrylate, cyclohexyl methacrylate, phenyl acrylate, phenyl methacrylate, nonylphenyl acrylate, nonylphenyl methacrylate, benzyl acrylate, benzyl methacrylate, dicyclopentenyl acrylate, dicyclopentenyl methacrylate, bornyl acrylate, bornyl methacrylate, 1,3-butanediol diacrylate, 1,3-butanediol dimethacrylate, 1,4-butanediol diacrylate, 1,4-butanediol dimethacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, 1,6-hexanediol diacrylate, 1,6-hexanediol dimethacrylate, dipropylene glycol diacrylate, dipropylene glycol dimethacrylate, trimethylolpropane triacrylate, trimethylolpropane trimethacrylate, glycerol acrylate, glycerol methacrylate, styrene, methylstyrene, and vinyltoluene. They may be used either solely or as a mixture of two or more.

Specific examples of hydrophilic monomers include acrylic acid, methacrylic acid, maleic acid, and itaconic acid.

The copolymer resin of a hydrophobic monomer and a hydrophilic monomer is preferably at least any one of styrene-(meth) acrylic acid copolymer resins, styrene-methylstyrene-(meth)acrylic acid copolymer resins, styrene-maleic acid copolymer resins, (meth)acrylic acid-(meth)acrylic ester copolymer resins, and styrene-(meth)acrylic acid-(meth) acrylic ester copolymer resins, from the viewpoints of simultaneously satisfying color image gloss, bronzing prevention, and ink composition storage stability requirements and, at the same time, forming color images having better gloss.

The copolymer resin may be a resin (styrene-acrylic acid resin) comprising a polymer produced by reacting styrene with acrylic acid or an acrylic ester. Alternatively, the copolymer resin may be an acrylic acid-type water soluble resin. Alternatively, salts thereof, for example, sodium, potassium, or ammonium salts thereof, may also be used.

The content of the copolymer resin is preferably 10 to 50 parts by weight, more preferably 10 to 35 parts by weight, based on 100 parts by weight of the pigment, from the viewpoints of simultaneously satisfying color image gloss, bronzing prevention, and ink composition storage stability requirements and, at the same time, forming color images having better gloss.

Further, in the present invention, the use of a urethane resin as the pigment dispersant can simultaneously satisfy color image gloss, bronzing prevention, and ink composition storage stability requirements and, at the same time, can realize the formation of color images having better gloss. The urethane resin is a resin containing a polymer produced by reacting a diisocyanate compound with a diol compound. In the present invention, preferably, the resin contains a urethane bond and/or an amide bond and an acidic group.

The ink composition according to the present invention preferably comprises at least one resin, which is selected from styrene-acrylic acid copolymer resins, urethane resins, and fluorene resins, as a dispersant for dispersing the colorant. The copolymer resin is adsorbed to a pigment to improve the dispensability of the pigment. In some embodiments, the dispersant is contained in an amount of 1.0 to 6.0% by weight based on the ink composition Diol compounds include, for example, polyether diol compounds such as polyethylene glycol and polypropylene glycol, polyester diol compounds such as polyethylene adipate and polybutylene adipate, and polycarbonate diol compounds.

Preferably, the urethane resin contains a carboxyl group.

Further, in the present invention, fluorene resins may also be used as the pigment dispersant.

The weight ratio between the copolymer resin and the urethane resin (copolymer resin/urethane resin) is preferably 1/2 to 2/1 and is more preferably 1/1.5 to 1.5/1 from the viewpoints of simultaneously satisfying color image gloss, bronzing prevention, and ink composition storage stability requirements and, at the same time, forming color images having better gloss.

The weight ratio between the solid content of the pigment and the solid content of the ingredients other than the pigment (solid content of the pigment/solid content of ingredients other than the pigment) is preferably 100/20 to 100/80 from the viewpoints of simultaneously satisfying color image gloss, bronzing prevention, and ink composition storage stability requirements and, at the same time, forming color images having better gloss.

The content of the copolymer resin is preferably 10 to 50 parts by weight, more preferably 10 to 35 parts by weight, based on 100 parts by weight of the pigment, from the viewpoints of simultaneously satisfying color image gloss, bronzing prevention, and ink composition storage stability requirements and, at the same time, forming color images having better gloss.

The content of the urethane resin is preferably 10 to 40 parts by weight, more preferably 10 to 35 parts by weight, based on 100 parts by weight of the pigment, from the viewpoints of simultaneously satisfying color image gloss, bronzing prevention, and ink composition storage stability requirements and, at the same time, forming color images having better gloss.

The content of the fluorene resin is preferably 20 to 200 parts by weight, more preferably 10 to 80 parts by weight, based on 100 parts by weight of the pigment, from the viewpoints of simultaneously satisfying color image gloss, bronzing prevention, and ink composition storage stability requirements and, at the same time, forming color images having better gloss.

The total content of the copolymer resin and the urethane resin is preferably not more than 90 parts by weight, more preferably not more than 70 parts by weight, based on 100 parts by weight of the pigment from the viewpoints of simultaneously satisfying color image gloss, bronzing prevention, and ink composition storage stability requirements and, at the same time, forming color images having better gloss.

The acid value of the copolymer resin is preferably 50 to 320, more preferably 100 to 250, from the viewpoints of simultaneously satisfying color image gloss, bronzing prevention, and ink composition storage stability requirements and, at the same time, forming color images having better gloss.

The acid value of the urethane resin is preferably 10 to 300, more preferably 20 to 100, from the viewpoints of simultaneously satisfying color image gloss, bronzing prevention, and ink composition storage stability requirements and, at the same time, forming color images having better gloss. The acid value is the amount (mg) of KOH necessary for neutralizing 1 g of the resin.

The weight-average molecular weight (Mw) of the copolymer resin is preferably 2,000 to 30,000, more preferably 2,000 to 20,000, from the viewpoints of simultaneously satisfying color image gloss, bronzing prevention, and ink composition storage stability requirements and, at the same time, forming color images having better gloss.

The weight-average molecular weight (Mw) before crosslinking of the urethane resin is preferably 100 to 200,000, more preferably 1,000 to 50,000, from the viewpoints of simultaneously satisfying color image gloss, bronzing prevention, and ink composition storage stability requirements and, at the same time, forming color images having better gloss. Mw is measured, for example, by GPC (gel permeation chromatography).

The glass transition temperature (Tg; as measured according to JIS K 6900) of the copolymer resin is preferably 30° C. or above, more preferably 50 to 130° C., from the viewpoints of simultaneously satisfying color image gloss, bronzing prevention, and ink composition storage stability requirements and, at the same time, forming color images having better gloss.

The glass transition temperature (Tg; as measured according to JIS K 6900) of the urethane resin is preferably −50 to 200° C., more preferably −50 to 100° C., from the viewpoints of simultaneously satisfying color image gloss, bronzing prevention, and ink composition storage stability requirements and, at the same time, forming color images having better gloss.

In the pigment dispersion, the copolymer resin is adsorbed on the pigment in some cases and is in a free state in other cases. From the viewpoints of simultaneously satisfying color image gloss, bronzing prevention, and ink composition storage stability requirements and, at the same time, forming color images having better gloss, preferably, the maximum particle diameter of the copolymer resin is not more than 0.3 μm, and the average particle diameter of the copolymer resin is not more than 0.2 μm, more preferably not more than 0.1 μm. The average particle diameter is an average dispersion diameter (50% cumulative diameter) of particles, which the pigment forms, in the dispersion and may be measured, for example, with Microtrac UPA (Microtrac Inc.).

Any fluorene resin having a fluorene skeleton may be used without limitation. For example, the fluorene resin may be produced by copolymerizing the following monomer units:
cyclohexane, 5-isocyanate-1-(isocyanatemethyl)-1,3,3-trimethyl (CAS No. 4098-71-9);
ethanol, 2,2'-[9H-fluoren-9-ylidenebis(4,1-phenyleneoxy)]bis(CAS No. 117344-32-8);
propionic acid, 3-hydroxy-2-(hydroxymethyl)-2-methyl (CAS No. 4767-03-7); and
ethanamine, N,N-diethyl- (CAS No. 121-44-8)

Surfactants may be used as the dispersant. Examples of surfactants that are preferred as dispersants include anionic surfactants such as fatty acid salts, higher alkyldicarboxylic acid salts, higher alcohol sulfuric ester salts, higher alkylsulfonic acid salts, condensates of higher fatty acids with amino acids, sulfosuccinic ester salts, naphthenic acid salts, liquid fatty oil sulfuric ester salts, and alkylallylsulfonic acid salts; cationic surfactants such as fatty acid amine salts, quaternary ammonium salts, sulfonium salts, and phosphoniums; and nonionic surfactants such as polyoxyethylene alkyl ethers, polyoxyethylene alkyl esters, sorbitan alkyl esters, and polyoxyethylene sorbitan alkyl esters. It is needless to say that the above surfactants, when added to the ink composition, can function also as a surfactant.

<Surfactant>

The ink composition for ink jet recording according to the present invention contains a surfactant as an indispensable ingredient. When the recording medium used has on its surface a resin coating receptive to ink, the use of a surfactant in the ink composition for ink jet recording can realize images having excellent gloss even on recording media, in which greater importance is attached to a glossy impression, for example, photographic paper. Even when a recording medium comprising a surface receptive layer provided with a coating layer for receiving an oil-based ink, for example, printing paper for running-on, is used, color-to-color bleeding can be prevented and, at the same time, reflected light-derived whitening caused by increasing the deposition amount of the ink can be prevented.

In the present invention, organopolysiloxane surfactants are suitable for use as the surfactant. In forming a recorded image, organopolysiloxane surfactants can enhance the wettability of the surface of the recording medium by ink and can enhance the penetration of the ink into the recording medium. When organopolysiloxane surfactants are used, since three types of alcohol solvents as described above are contained, the solubility of the surfactant in the ink is improved to suppress the occurrence of insolubles and the like, whereby an ink composition having better ejection stability can be realized.

Such surfactants may be commercially available products, and examples thereof include PD-501, PD-502, and PD-570 (all the above products being manufactured by Nissin Chemical Industry Co., Ltd.).

More preferably, the ink composition contains one or at least two compounds represented by formula (I) as the organopolysiloxane surfactant:

[Chemical formula 1]

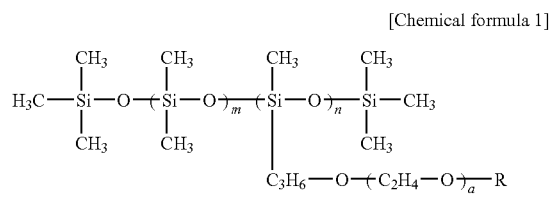

wherein R represents a hydrogen atom or a methyl group; a is an integer of 2 to 11; m is an integer of 2 to 50; and n is an integer of 1 to 5, or contains one or at least two compounds represented by formula (I) wherein R represents a hydrogen atom or a methyl group; a is an integer of 2 to 13; m is an integer of 2 to 50; and n is an integer of 1 to 5. Further, more preferably, one or at least two compounds represented by formula (I) wherein R represents a hydrogen atom or a methyl group; a is an integer of 2 to 13; m is an integer of 2 to 50; and n is an integer of 1 to 8 is contained as the surfactant. Furthermore, more preferably, one or at least two compounds represented by formula (I), wherein R represents a methyl group; a is an integer of 6 to 18; m is 0 (zero); and n is 1, is contained as the surfactant. When such specific organopolysiloxane surfactants are used, uneven coagulation of the ink can be further reduced even when printing is performed on printing paper for running-on as a recording medium.

The use of compounds represented by formula (I) wherein a is an integer of 2 to 5; m is an integer of 20 to 40; and n is an integer of 2 to 4, compounds represented by formula (I) wherein a is an integer of 7 to 11; m is an integer of 30 to 50; and n is an integer of 3 to 5, compounds represented by formula (I) wherein a is an integer of 9 to 13; m is an integer of 2 to 4; and n is an integer of 1 or 2, or compounds represented by formula (I) wherein a is an integer of 6 to 10; m is an integer of 10 to 20; and n is an integer of 4 to 8 is preferred. When such compounds are used, uneven coagulation of the ink can be further reduced.

Further, the use of compounds represented by formula (I) wherein R represents a hydrogen atom; a is an integer of 2 to 5; m is an integer of 20 to 40; and n is an integer of 2 to 4, or compounds represented by formula (I) wherein a is an integer of 7 to 11; m is an integer of 30 to 50; and n is an integer of 3 to 5 is further preferred. When such compounds are used, uneven coagulation and feathering or bleeding of the ink can be further reduced.

Furthermore, the use of compounds represented by formula (I) wherein R represents a methyl group; a is an integer of 9 to 13; m is an integer of 2 to 4; and n is an integer of 1 or 2, or compounds represented by formula (I) wherein a is an integer of 6 to 10; m is an integer of 10 to 20; and n is an integer of 4 to 8 is further preferred. When such compounds are used, uneven coagulation and feathering or bleeding of the ink can be further reduced.

Furthermore, the use of compounds represented by formula (I) wherein R represents a methyl group; a is an integer of 6 to 12; m is 0 (zero); and n is 1 is further preferred. When such compounds are used, uneven coagulation and feathering or bleeding can be further reduced.

The use of a mixture of a compound represented by formula (I) wherein R represents a hydrogen atom; a is an integer of 7 to 11; m is an integer of 30 to 50; and n is an integer of 3 to 5, a compound represented by formula (I) wherein R represents a methyl group; a is an integer of 9 to 13; m is an integer of 2 to 4; and n is an integer of 1 or 2, and a compound represented by formula (I) wherein R represents a methyl group; a is an integer of 6 to 10; m is an integer of 10 to 20; and n is an integer of 4 to 8 is most preferred. When the mixture is used, uneven coagulation and feathering or bleeding can be further reduced.

The use of a mixture of a compound represented by formula (I) wherein R represents a hydrogen atom; a is an integer of 7 to 11; m is an integer of 30 to 50; and n is an integer of 3 to 5, a compound represented by formula (I) wherein R represents a methyl group; a is an integer of 9 to 13; m is an integer of 2 to 4; and n is an integer of 1 or 2, and a compound represented by formula (I) wherein R represents a methyl group; a is an integer of 6 to 18; m is 0 (zero); and n is an integer of 1 is most preferred. When the mixture is used, uneven coagulation and feathering or bleeding can be further reduced.

The content of the surfactant in the ink composition according to the present invention is preferably 0.01 to 1.0% by weight, more preferably 0.05 to 0.50% by weight. The combined use of the surfactant wherein R represents a methyl group and the surfactant wherein R represents a hydrogen atom is more preferred because the collapse of characters of small fonts can be avoided. In particular, preferably, the surfactant content, when the surfactant wherein R represents a methyl group is used, is higher than the surfactant content when the surfactant, wherein R represents H, is used, from the viewpoint of coagulation spots of ink.

The higher the content of the surfactant wherein R represents H as compared with the content of the surfactant wherein R represents a methyl group, the better the results. Specifically, when the surfactant wherein R represents H is much higher than the content of the surfactant wherein R represents a methyl group, the occurrence of coagulation spots and feathering or bleeding of the ink can be reduced even when printing is performed on printing paper for running-on, which is likely to repel ink and into which the ink is penetrated, for example, a cast coated paper, at a low speed.

Other surfactants, specifically acetylene glycol surfactants, anionic surfactants, nonionic surfactants, amphoteric surfactants and the like, may be further added to the ink composition according to the present invention.

Examples of acetylene glycol surfactants among these other surfactants include 2,4,7,9-tetramethyl-5-decyne-4,7-diol, 3,6-dimethyl-4-octyne-3,6-diol, 3,5-dimethyl-1-hexyn-3-ol, or 2,4-dimethyl-5-hexyn-3-ol. Acetylene glycol surfactants may also be commercially available products. Examples thereof include Olfine E1010, Olfine STG, or Olfine Y (tradename, manufactured by Nissin Chemical Industry Co., Ltd.) and Surfynol 61, Surfynol 104, Surfynol 82, Surfynol 465, Surfynol 485 or Surfynol TG (tradename, manufactured by Air Products and Chemicals Inc.).

<Water and Other Ingredients>

The ink composition for ink jet recording according to the present invention comprises the above specific alcohol solvent and surfactant, other various additives and, further, water as a solvent. Water is preferably pure water obtained by ion exchange, ultrafiltration, reverse osmosis, distillation or the like, or ultrapure water. These waters, which have been sterilized, for example, by ultraviolet irradiation or by addition of hydrogen peroxide, are particularly preferred because they can prevent the occurrence of mold or bacteria in the ink composition for a long period of time.

Further, the ink composition according to the present invention preferably comprises a penetrating agent in addition to the above ingredients.

Glycol ethers are suitable as the penetrating agent.

Specific examples of glycol ethers usable herein include ethylene glycol monomethyl ether, ethylene glycol monoethyl ether, ethylene glycol mono-iso-propyl ether, ethylene glycol mono-n-butyl ether, ethylene glycol mono-iso-butyl ether, ethylene glycol mono-tert-butyl ether, ethylene glycol monomethyl ether acetate, diethylene glycol monomethyl ether, diethylene glycol monoethyl ether, diethylene glycol mono-n-propyl ether, diethylene glycol mono-iso-propyl ether, diethylene glycol mono-n-butyl ether, diethylene glycol mono-tert-butyl ether, triethylene glycol mono-n-butyl ether, propylene glycol monomethyl ether, propylene glycol monoethyl ether, propylene glycol mono-n-propyl ether, propylene glycol mono-iso-propyl ether, propylene glycol mono-n-butyl ether, propylene glycol mono-tert-butyl ether, dipropylene glycol monomethyl ether, dipropylene glycol monoethyl ether, dipropylene glycol mono-n-propyl ether, dipropylene glycol-iso-propyl ether, dipropylene glycol mono-n-butyl ether, dipropylene glycol mono-tert-butyl ether, and 1-methyl-1-methoxybutanol. They may be used either solely or as a mixture of two or more.

Among the above glycol ethers, alkyl ethers of polyhydric alcohols are preferred. Particularly preferred are ethylene glycol monoethyl ether, ethylene glycol mono-n-butyl ether, diethylene glycol monomethyl ether, diethylene glycol monoethyl ether, diethylene glycol mono-n-butyl ether, triethylene glycol monomethyl ether, triethylene glycol monoethyl ether, or triethylene glycol mono-n-butyl ether. More preferred are triethylene glycol mono-n-butyl ether.

The addition amount of the penetrating agent may be properly determined but is preferably about 0.1 to 30% by weight, more preferably about 1 to 20% by weight.

Preferably, the ink composition according to the present invention further comprises a solubilizer for a recording medium in addition to the above ingredients.

Pyrrolidones such as N-methyl-2-pyrrolidone are suitable as a solubilizer for a recording medium. The addition amount of the solubilizer for a recording medium may be properly determined but is preferably about 0.1 to 30% by weight, more preferably about 1 to 20% by weight.

Preferably, the ink composition for ink jet recording according to the present invention is substantially free from a wetting agent. The wetting agent functions to prevent ink from drying to solidify, for example, in ink jet nozzles. Accordingly, when the ink containing a wetting agent is dropped on a synthetic paper having a low ink absorbing capability, the ink is not sometimes dried and consequently poses a problem when printing is performed at a high speed. Further, the use of the ink containing a wetting agent sometimes poses a problem that, in such a state that ink, which remains unabsorbed, stays on the surface of the recording medium, a fresh ink is deposited on the recording medium, sometimes leading to the occurrence of coagulation spots.

Accordingly, in the present invention, when recording media having the low ink absorbing capability are used, preferably, the wetting agent is substantially free from the wetting agent. When ink has been unfavorably dried and solidified in ink jet nozzles, the solidified ink can be redissolved by applying a solution containing a wetting agent.

In particular, preferably, the ink composition according to the present invention is substantially free from a wetting agent that is liquid at 20° C.

The term "wetting agent" as used herein means a wetting agent that is used in conventional inks for ink jet recording, and specific examples thereof include water soluble alkanediols having 3 to 5 carbon atoms such as glycerin, ethylene glycol, diethylene glycol, triethylene glycol, propylene glycol, 1,3-propanediol, 3-methyl-1,3-butanediol, 1,3-butanediol, and 1,2-pentanediol; trimethylolpropane; trimethylolmethane; and trimethylolethane. The expression "substantially free from" means that the addition amount of the wetting agent is less than 1% by weight based on the ink composition. It would be apparent to a person having ordinary skill in the art that a part of the penetration solvent functions also as a wetting agent. In the present invention, the penetration solvent is excluded from the wetting agent.

If necessary, other additives, for example, nozzle clogging preventive agents, preservatives, antioxidants, electric conductivity adjustors, pH adjustors, viscosity modifiers, surface tension modifiers, and oxygen absorbers, may be added to the ink composition according to the present invention.

For example, sodium benzoate, sodium pentachlorophenol, sodium 2-pyridinethiol-1-oxide, sodium sorbate, sodium dehydroacetate, and 1,2-dibenzinethiazolin-3-one (Proxel CRL, Proxel BND, Proxel GXL, Proxel XL-2, and Proxel TN, manufactured by ICI) may be used as preservatives and antimolds.

Examples of pH adjustors, solubilizers, or antioxidants usable herein include amines such as diethanolamine, triethanolamine, propanolamine, and morpholine, and modification products thereof; inorganic salts such as potassium hydroxide, sodium hydroxide, and lithium hydroxide; ammonium hydroxide; quaternary ammonium hydroxides such as tetramethylammonium; salts of carbonic acid such as potassium carbonate, sodium carbonate, and lithium carbonate; salts of phosphoric acid, such as potassium phosphate, sodium phosphate, and lithium phosphate; N-methyl-2-pyrrolidone; urea compounds such as urea, thiourea, and tetramethylurea; allophanates such as allophanate and methyl allophanate; biurets such as biuret, dimethylbiuret, and tetramethylbiuret; and L-ascorbic acid and salts thereof.

The ink composition according to the present invention may contain an antioxidant and an ultraviolet absorber, and examples thereof include Tinuvin 328, Tinuvin 900, Tinuvin 1130, Tinuvin 384, Tinuvin 292, Tinuvin 123, Tinuvin 144, Tinuvin 622, Tinuvin 770 and Tinuvin 292 manufactured by Ciba Specialty Chemicals, K.K.; Irgacor 252 and Irgacor 153; Irganox 1010, Irganox 1076, and Irganox 1035; MD 1024; and lanthanide oxides.

The ink composition according to the present invention can be produced by dispersing and mixing the above ingredients by a suitable method. Preferably, an ink solution is prepared by first mixing the pigment, the polymeric dispersant, and water together by a suitable dispergator, for example, a ball mill, a sand mill, an attritor, a roll mill, an agitator mill, a Henschel mixer, a colloid mill, an ultrasonic homogenizer, a jet mill, or an angmill to prepare a homogeneous pigment dispersion, then adding, for example, separately prepared resins (resin emulsion), water, water soluble organic solvents, saccharides, pH adjustors, preservatives and antimolds, and satisfactorily dissolving the components. After the satisfactory stirring, the mixture can be filtered for the removal of coarse particles and foreign matter causative of clogging to prepare a contemplated ink composition.

Method for Ink Jet Recording

The method for ink jet recording according to the present invention comprises ejecting droplets of the ink composition and depositing the ejected droplets onto a recording medium to perform printing. In the method for ink jet recording according to the present invention, the use of synthetic papers and printing papers for running-on as the recording medium is preferred. In particular, in art papers, papers for high-quality printing used in POD (print on demand) applications, and specialty papers for laser printers, high-quality images free from white streaks or a roughness feeling can be realized even when printing is performed at a low resolution. Papers for high-quality printing used for POD applications include, for example, Ricoh business coat gloss 100 (manufactured by Ricoh Company, Ltd.). Specialty papers for laser printers include, for example, LPCCTA4 (manufactured by SEIKO EPSON CORPORATION).

EXAMPLES

The following Examples further illustrate the present invention. However, it should be noted that the present invention is not limited to these Examples.

<Preparation of Ink Compositions>

Ingredients were mixed together according to the formulations shown in Table 1, and the mixtures were filtered through a 10-μm membrane filter to prepare inks. In the table, the styrene-acrylic acid resin is a copolymer having a molecular weight of 1,600 and an acid value of 150. The urethane resin is a copolymer having a molecular weight of 6,000 and an acid value of 50. The fluorene resin is a resin that contains a fluorene skeleton-containing monomer designated by CAS No. 117344-32-8 (monomer component proportion ratio: about 50% by weight) and has a molecular weight of 3,300. The surfactant used was an organopolysiloxane surfactant that was a mixture of a compound represented by formula (I) wherein R represents a hydrogen atom; a is an integer of 7 to 11; m is an integer of 30 to 50; and n is an integer of 3 to 5, and a compound represented by formula (I) wherein R represents a methyl group; a is an integer of 9 to 13; m is an integer of 2 to 4; and n is an integer of 1 or 2.

TABLE 1

| Composition | | Example 1 Ink set 1 | | | | Example 2 Ink set 2 | | | | Example 3 Ink set 3 | | | | Example 4 Ink set 4 | | | |
|---|---|---|---|---|---|---|---|---|---|---|---|---|---|---|---|---|---|
| | | 1Y | 1M | 1C | 1K | 2Y | 2M | 2C | 2K | 3Y | 3M | 3C | 3K | 4Y | 4M | 4C | 4K |
| Colorant | C.I. Pigment Yellow 74 | 8.0 | — | — | — | 8.0 | — | — | — | 8.0 | — | — | — | 8.0 | — | — | — |
| | C.I. Pigment Red 122 | — | 8.0 | — | — | — | 8.0 | — | — | — | 8.0 | — | — | — | 8.0 | — | — |
| | C.I. Pigment Blue 15:4 | — | — | 8.0 | — | — | — | 8.0 | — | — | — | 8.0 | — | — | — | 8.0 | — |
| | C.I. Pigment Black 6 | — | — | — | 8.0 | — | — | — | 8.0 | — | — | — | 8.0 | — | — | — | 8.0 |
| Dispersant | Styrene-acrylic resin | 3.2 | 3.2 | 3.2 | 3.2 | 3.2 | 3.2 | 3.2 | 3.2 | 3.2 | 3.2 | 3.2 | 3.2 | 3.2 | 3.2 | 3.2 | 3.2 |
| | Urethane resin | — | — | — | — | — | — | — | — | — | — | — | — | — | — | — | — |
| | Fluorene resin | — | — | — | — | — | — | — | — | — | — | — | — | — | — | — | — |
| Alcohol solvent | 1,2,6-Hexanetriol | 3 | 3 | 3 | 3 | 3 | 3 | 3 | 3 | 3 | 3 | 3 | 3 | 3 | 3 | 3 | 3 |
| | 1,2-Hexanediol | 1 | 1 | 1 | 1 | 1 | 1 | 1 | 1 | 6 | 6 | 6 | 6 | 6 | 6 | 6 | 6 |
| | 1,2-Octanediol | 1 | 1 | 1 | 1 | 3 | 3 | 3 | 3 | 1 | 1 | 1 | 1 | 3 | 3 | 3 | 3 |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Balance | Balance | Balance | Balance | Balance | Balance | Balance | Balance | Balance | Balance | Balance | Balance | Balance | Balance | Balance | Balance |
| Balance | | 100 | 100 | 100 | 100 | 100 | 100 | 100 | 100 | 100 | 100 | 100 | 100 | 100 | 100 | 100 | 100 |

| Composition | | Example 5 Ink set 5 | | | | Example 6 Ink set 6 | | | | Example 7 Ink set 7 | | | | Example 8 Ink set 8 | | | |
|---|---|---|---|---|---|---|---|---|---|---|---|---|---|---|---|---|---|
| | | 5Y | 5M | 5C | 5K | 6Y | 6M | 6C | 6K | 7Y | 7M | 7C | 7K | 8Y | 8M | 8C | 8K |
| Colorant | C.I. Pigment Yellow 74 | 8.0 | — | — | — | 8.0 | — | — | — | 8.0 | — | — | — | 8.0 | — | — | — |
| | C.I. Pigment Red 122 | — | 8.0 | — | — | — | 8.0 | — | — | — | 8.0 | — | — | — | 8.0 | — | — |
| | C.I. Pigment Blue 15:4 | — | — | 8.0 | — | — | — | 8.0 | — | — | — | 8.0 | — | — | — | 8.0 | — |
| | C.I. Pigment Black 6 | — | — | — | 8.0 | — | — | — | 8.0 | — | — | — | 8.0 | — | — | — | 8.0 |
| Dispersant | Styrene-acrylic resin | 3.2 | 3.2 | 3.2 | 3.2 | 3.2 | 3.2 | 3.2 | 3.2 | 3.2 | 3.2 | 3.2 | 3.2 | 3.2 | 3.2 | 3.2 | 3.2 |
| | Urethane resin | — | — | — | — | — | — | — | — | — | — | — | — | — | — | — | — |
| | Fluorene resin | — | — | — | — | — | — | — | — | — | — | — | — | — | — | — | — |
| Alcohol solvent | 1,2,6-Hexanetriol | 8 | 8 | 8 | 8 | 8 | 8 | 8 | 8 | 8 | 8 | 8 | 8 | 8 | 8 | 8 | 8 |
| | 1,2-Hexanediol | 1 | 1 | 1 | 1 | 1 | 1 | 1 | 1 | 6 | 6 | 6 | 6 | 6 | 6 | 6 | 6 |
| | 1,2-Octanediol | 1 | 1 | 1 | 1 | 3 | 3 | 3 | 3 | 1 | 1 | 1 | 1 | 3 | 3 | 3 | 3 |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Balance | Balance | Balance | Balance | Balance | Balance | Balance | Balance | Balance | Balance | Balance | Balance | Balance | Balance | Balance | Balance |
| Balance | | 100 | 100 | 100 | 100 | 100 | 100 | 100 | 100 | 100 | 100 | 100 | 100 | 100 | 100 | 100 | 100 |

| Composition | | Example 9 Ink set 9 | | | | Example 10 Ink set 10 | | | | Example 11 Ink set 11 | | | | Example 12 Ink set 12 | | | |
|---|---|---|---|---|---|---|---|---|---|---|---|---|---|---|---|---|---|
| | | 9Y | 9M | 9C | 9K | 10Y | 10M | 10C | 10K | 11Y | 11M | 11C | 11K | 12Y | 12M | 12C | 12K |
| Colorant | C.I. Pigment Yellow 74 | 8.0 | — | — | — | 8.0 | — | — | — | 8.0 | — | — | — | 8.0 | — | — | — |
| | C.I. Pigment Red 122 | — | 8.0 | — | — | — | 8.0 | — | — | — | 8.0 | — | — | — | 8.0 | — | — |
| | C.I. Pigment Blue 15:4 | — | — | 8.0 | — | — | — | 8.0 | — | — | — | 8.0 | — | — | — | 8.0 | — |
| | C.I. Pigment Black 6 | — | — | — | 8.0 | — | — | — | 8.0 | — | — | — | 8.0 | — | — | — | 8.0 |

TABLE 1-continued

| | Composition | 13Y | 13M | 13C | 13K | 14Y | 14M | 14C | 14K | 15Y | 15M | 15C | 15K | 16Y | 16M | 16C | 16K |
|---|---|---|---|---|---|---|---|---|---|---|---|---|---|---|---|---|---|
| Dispersant | Styrene-acrylic resin | 3.2 | 3.2 | 3.2 | 3.2 | 3.2 | 3.2 | 3.2 | 3.2 | 3.2 | 3.2 | 3.2 | 3.2 | 3.2 | 3.2 | 3.2 | 3.2 |
| | Urethane resin | — | — | — | — | — | — | — | — | — | — | — | — | — | — | — | — |
| | Fluorene resin | 18 | 18 | 18 | 18 | 18 | 18 | 18 | 18 | 18 | 18 | 18 | 18 | 18 | 18 | 18 | 18 |
| Alcohol solvent | 1,2,6-Hexanetriol | 1 | 1 | 1 | 1 | 1 | 1 | 1 | 1 | 6 | 6 | 6 | 6 | 6 | 6 | 6 | 6 |
| | 1,2-Hexanediol | 1 | 1 | 1 | 1 | 1 | 1 | 1 | 1 | 1 | 1 | 1 | 1 | 3 | 3 | 3 | 3 |
| | 1,2-Octanediol | — | — | — | — | 3 | 3 | 3 | 3 | — | — | — | — | — | — | — | — |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Balance | Balance | Balance | Balance | Balance | Balance | Balance | Balance | Balance | Balance | Balance | Balance | Balance | Balance | Balance | Balance |
| | Balance | 100 | 100 | 100 | 100 | 100 | 100 | 100 | 100 | 100 | 100 | 100 | 100 | 100 | 100 | 100 | 100 |
| | | Example 13 Ink set 13 | | | | Example 14 Ink set 14 | | | | Example 15 Ink set 15 | | | | Example 16 Ink set 16 | | | |

| | Composition | 17Y | 17M | 17C | 17K | 18Y | 18M | 18C | 18K | 19Y | 19M | 19C | 19K | 20Y | 20M | 20C | 20K |
|---|---|---|---|---|---|---|---|---|---|---|---|---|---|---|---|---|---|
| Colorant | C.I. Pigment Yellow 74 | 8.0 | — | — | — | 8.0 | — | — | — | 8.0 | — | — | — | 8.0 | — | — | — |
| | C.I. Pigment Red 122 | — | 8.0 | — | — | — | 8.0 | — | — | — | 8.0 | — | — | — | 8.0 | — | — |
| | C.I. Pigment Blue 15:4 | — | — | 8.0 | — | — | — | 8.0 | — | — | — | 8.0 | — | — | — | 8.0 | — |
| | C.I. Pigment Black 6 | — | — | — | 8.0 | — | — | — | 8.0 | — | — | — | 8.0 | — | — | — | 8.0 |
| Dispersant | Styrene-acrylic resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Urethane resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Fluorene resin | — | — | — | — | — | — | — | — | — | — | — | — | — | — | — | — |
| Alcohol solvent | 1,2,6-Hexanetriol | 3 | 3 | 3 | 3 | 3 | 3 | 3 | 3 | 3 | 3 | 3 | 3 | 3 | 3 | 3 | 3 |
| | 1,2-Hexanediol | 1 | 1 | 1 | 1 | 1 | 1 | 1 | 1 | 6 | 6 | 6 | 6 | 6 | 6 | 6 | 6 |
| | 1,2-Octanediol | 3 | 3 | 3 | 3 | 3 | 3 | 3 | 3 | 1 | 1 | 1 | 1 | 3 | 3 | 3 | 3 |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Balance | Balance | Balance | Balance | Balance | Balance | Balance | Balance | Balance | Balance | Balance | Balance | Balance | Balance | Balance | Balance |
| | Balance | 100 | 100 | 100 | 100 | 100 | 100 | 100 | 100 | 100 | 100 | 100 | 100 | 100 | 100 | 100 | 100 |
| | | Example 17 Ink set 17 | | | | Example 18 Ink set 18 | | | | Example 19 Ink set 19 | | | | Example 20 Ink set 20 | | | |

| | Composition | 21Y | 21M | 21C | 21K | 22Y | 22M | 22C | 22K | 23Y | 23M | 23C | 23K | 24Y | 24M | 24C | 24K |
|---|---|---|---|---|---|---|---|---|---|---|---|---|---|---|---|---|---|
| Colorant | C.I. Pigment Yellow 74 | 8.0 | — | — | — | 8.0 | — | — | — | 8.0 | — | — | — | 8.0 | — | — | — |
| | C.I. Pigment Red 122 | — | 8.0 | — | — | — | 8.0 | — | — | — | 8.0 | — | — | — | 8.0 | — | — |
| | C.I. Pigment Blue 15:4 | — | — | 8.0 | — | — | — | 8.0 | — | — | — | 8.0 | — | — | — | 8.0 | — |
| | C.I. Pigment Black 6 | — | — | — | 8.0 | — | — | — | 8.0 | — | — | — | 8.0 | — | — | — | 8.0 |
| Dispersant | Styrene-acrylic resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Urethane resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Fluorene resin | — | — | — | — | — | — | — | — | — | — | — | — | — | — | — | — |
| Alcohol solvent | 1,2,6-Hexanetriol | 8 | 8 | 8 | 8 | 8 | 8 | 8 | 8 | 8 | 8 | 8 | 8 | 8 | 8 | 8 | 8 |
| | 1,2-Hexanediol | 6 | 6 | 6 | 6 | 1 | 1 | 1 | 1 | 6 | 6 | 6 | 6 | 6 | 6 | 6 | 6 |
| | 1,2-Octanediol | 3 | 3 | 3 | 3 | 3 | 3 | 3 | 3 | 1 | 1 | 1 | 1 | 3 | 3 | 3 | 3 |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Balance | Balance | Balance | Balance | Balance | Balance | Balance | Balance | Balance | Balance | Balance | Balance | Balance | Balance | Balance | Balance |
| | Balance | 100 | 100 | 100 | 100 | 100 | 100 | 100 | 100 | 100 | 100 | 100 | 100 | 100 | 100 | 100 | 100 |
| | | Example 21 Ink set 21 | | | | Example 22 Ink set 22 | | | | Example 23 Ink set 23 | | | | Example 24 Ink set 24 | | | |

TABLE 1-continued

| | Composition | 21Y | 21M | 21C | 21K | 22Y | 22M | 22C | 22K | 23Y | 23M | 23C | 23K | 24Y | 24M | 24C | 24K |
|---|---|---|---|---|---|---|---|---|---|---|---|---|---|---|---|---|---|
| Colorant | C.I. Pigment Yellow 74 | 8.0 | — | — | — | 8.0 | — | — | — | 8.0 | — | — | — | 8.0 | — | — | — |
| | C.I. Pigment Red 122 | — | 8.0 | — | — | — | 8.0 | — | — | — | 8.0 | — | — | — | 8.0 | — | — |
| | C.I. Pigment Blue 15:4 | — | — | 8.0 | — | — | — | 8.0 | — | — | — | 8.0 | — | — | — | 8.0 | — |
| | C.I. Pigment Black 6 | — | — | — | 8.0 | — | — | — | 8.0 | — | — | — | 8.0 | — | — | — | 8.0 |
| Dispersant | Styrene-acrylic resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Urethane resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Fluorene resin | — | — | — | — | — | — | — | — | — | — | — | — | — | — | — | — |
| Alcohol solvent | 1,2,6-Hexanetriol | 18 | 18 | 18 | 18 | 18 | 18 | 18 | 18 | 18 | 18 | 18 | 18 | 18 | 18 | 18 | 18 |
| | 1,2-Hexanediol | 1 | 1 | 1 | 1 | 1 | 1 | 1 | 1 | 6 | 6 | 6 | 6 | 6 | 6 | 6 | 6 |
| | 1,2-Octanediol | 1 | 1 | 1 | 1 | 3 | 3 | 3 | 3 | 1 | 1 | 1 | 1 | 3 | 3 | 3 | 3 |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Balance | Balance | Balance | Balance | Balance | Balance | Balance | Balance | Balance | Balance | Balance | Balance | Balance | Balance | Balance | Balance |
| | Balance | 100 | 100 | 100 | 100 | 100 | 100 | 100 | 100 | 100 | 100 | 100 | 100 | 100 | 100 | 100 | 100 |

| | | Example 25 Ink set 25 | | | | Example 26 Ink set 26 | | | | Example 27 Ink set 27 | | | | Example 28 Ink set 28 | | | |
|---|---|---|---|---|---|---|---|---|---|---|---|---|---|---|---|---|---|
| | Composition | 25Y | 25M | 25C | 25K | 26Y | 26M | 26C | 26K | 27Y | 27M | 27C | 27K | 28Y | 28M | 28C | 28K |
| Colorant | C.I. Pigment Yellow 74 | 8.0 | — | — | — | 8.0 | — | — | — | 8.0 | — | — | — | 8.0 | — | — | — |
| | C.I. Pigment Red 122 | — | 8.0 | — | — | — | 8.0 | — | — | — | 8.0 | — | — | — | 8.0 | — | — |
| | C.I. Pigment Blue 15:4 | — | — | 8.0 | — | — | — | 8.0 | — | — | — | 8.0 | — | — | — | 8.0 | — |
| | C.I. Pigment Black 6 | — | — | — | 8.0 | — | — | — | 8.0 | — | — | — | 8.0 | — | — | — | 8.0 |
| Dispersant | Styrene-acrylic resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Urethane resin | — | — | — | — | — | — | — | — | — | — | — | — | — | — | — | — |
| | Fluorene resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| Alcohol solvent | 1,2,6-Hexanetriol | 3 | 3 | 3 | 3 | 3 | 3 | 3 | 3 | 3 | 3 | 3 | 3 | 3 | 3 | 3 | 3 |
| | 1,2-Hexanediol | 1 | 1 | 1 | 1 | 1 | 1 | 1 | 1 | 6 | 6 | 6 | 6 | 6 | 6 | 6 | 6 |
| | 1,2-Octanediol | 1 | 1 | 1 | 1 | 3 | 3 | 3 | 3 | 1 | 1 | 1 | 1 | 3 | 3 | 3 | 3 |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Balance | Balance | Balance | Balance | Balance | Balance | Balance | Balance | Balance | Balance | Balance | Balance | Balance | Balance | Balance | Balance |
| | Balance | 100 | 100 | 100 | 100 | 100 | 100 | 100 | 100 | 100 | 100 | 100 | 100 | 100 | 100 | 100 | 100 |

| | | Example 29 Ink set 29 | | | | Example 30 Ink set 30 | | | | Example 31 Ink set 31 | | | | Example 32 Ink set 32 | | | |
|---|---|---|---|---|---|---|---|---|---|---|---|---|---|---|---|---|---|
| | Composition | 29Y | 29M | 29C | 29K | 30Y | 30M | 30C | 30K | 31Y | 31M | 31C | 31K | 32Y | 32M | 32C | 32K |
| Colorant | C.I. Pigment Yellow 74 | 8.0 | — | — | — | 8.0 | — | — | — | 8.0 | — | — | — | 8.0 | — | — | — |
| | C.I. Pigment Red 122 | — | 8.0 | — | — | — | 8.0 | — | — | — | 8.0 | — | — | — | 8.0 | — | — |
| | C.I. Pigment Blue 15:4 | — | — | 8.0 | — | — | — | 8.0 | — | — | — | 8.0 | — | — | — | 8.0 | — |
| | C.I. Pigment Black 6 | — | — | — | 8.0 | — | — | — | 8.0 | — | — | — | 8.0 | — | — | — | 8.0 |
| Dispersant | Styrene-acrylic resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Urethane resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Fluorene resin | — | — | — | — | — | — | — | — | — | — | — | — | — | — | — | — |
| Alcohol solvent | 1,2,6-Hexanetriol | 8 | 8 | 8 | 8 | 8 | 8 | 8 | 8 | 8 | 8 | 8 | 8 | 8 | 8 | 8 | 8 |
| | 1,2-Hexanediol | 1 | 1 | 1 | 1 | 1 | 1 | 1 | 1 | 6 | 6 | 6 | 6 | 6 | 6 | 6 | 6 |
| | 1,2-Octanediol | 1 | 1 | 1 | 1 | 3 | 3 | 3 | 3 | 1 | 1 | 1 | 1 | 3 | 3 | 3 | 3 |

TABLE 1-continued

| | | | Example 33 Ink set 33 | | | Example 34 Ink set 34 | | | | Example 35 Ink set 35 | | | | Example 36 Ink set 36 | | | |
|---|---|---|---|---|---|---|---|---|---|---|---|---|---|---|---|---|---|
| | Composition | | 33Y | 33M | 33C | 33K | 34Y | 34M | 34C | 34K | 35Y | 35M | 35C | 35K | 36Y | 36M | 36C | 36K |
| Colorant | C.I. Pigment Yellow 74 | | 8.0 | — | — | — | 8.0 | — | — | — | 8.0 | — | — | — | 8.0 | — | — | — |
| | C.I. Pigment Red 122 | | — | 8.0 | — | — | — | 8.0 | — | — | — | 8.0 | — | — | — | 8.0 | — | — |
| | C.I. Pigment Blue 15:4 | | — | — | 8.0 | — | — | — | 8.0 | — | — | — | 8.0 | — | — | — | 8.0 | — |
| | C.I. Pigment Black 6 | | — | — | — | 8.0 | — | — | — | 8.0 | — | — | — | 8.0 | — | — | — | 8.0 |
| Dispersant | Styrene-acrylic resin | | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Urethane resin | | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Fluorene resin | | 18 | 18 | 18 | 18 | 18 | 18 | 18 | 18 | 18 | 18 | 18 | 18 | 18 | 18 | 18 | 18 |
| Alcohol solvent | 1,2,6-Hexanetriol | | 1 | 1 | 1 | 1 | 1 | 1 | 1 | 1 | 6 | 6 | 6 | 6 | 6 | 6 | 6 | 6 |
| | 1,2-Hexanediol | | 1 | 1 | 1 | 1 | 3 | 3 | 3 | 3 | 1 | 1 | 1 | 1 | 3 | 3 | 3 | 3 |
| | 1,2-Octanediol | | | | | | | | | | | | | | | | | |
| | Surfactant | | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | | Balance | Balance | Balance | Balance | Balance | Balance | Balance | Balance | Balance | Balance | Balance | Balance | Balance | Balance | Balance | Balance |
| | Balance | | 100 | 100 | 100 | 100 | 100 | 100 | 100 | 100 | 100 | 100 | 100 | 100 | 100 | 100 | 100 | 100 |

| | | Example 37 Ink set 37 | | | | Example 38 Ink set 38 | | | | Example 39 Ink set 39 | | | | Example 40 Ink set 40 | | | |
|---|---|---|---|---|---|---|---|---|---|---|---|---|---|---|---|---|---|
| | Composition | 37Y | 37M | 37C | 37K | 38Y | 38M | 38C | 38K | 39Y | 39M | 39C | 39K | 40Y | 40M | 40C | 40K |
| Colorant | C.I. Pigment Yellow 74 | 8.0 | — | — | — | 8.0 | — | — | — | 8.0 | — | — | — | 8.0 | — | — | — |
| | C.I. Pigment Red 122 | — | 8.0 | — | — | — | 8.0 | — | — | — | 8.0 | — | — | — | 8.0 | — | — |
| | C.I. Pigment Blue 15:4 | — | — | 8.0 | — | — | — | 8.0 | — | — | — | 8.0 | — | — | — | 8.0 | — |
| | C.I. Pigment Black 6 | — | — | — | 8.0 | — | — | — | 8.0 | — | — | — | 8.0 | — | — | — | 8.0 |
| Dispersant | Styrene-acrylic resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Urethane resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Fluorene resin | 3 | 3 | 3 | 3 | 3 | 3 | 3 | 3 | 6 | 6 | 6 | 6 | 6 | 6 | 6 | 6 |
| Alcohol solvent | 1,2,6-Hexanetriol | 1 | 1 | 1 | 1 | 1 | 1 | 1 | 1 | 1 | 1 | 1 | 1 | 3 | 3 | 3 | 3 |
| | 1,2-Hexanediol | 1 | 1 | 1 | 1 | 3 | 3 | 3 | 3 | | | | | | | | |
| | 1,2-Octanediol | | | | | | | | | | | | | | | | |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Balance | Balance | Balance | Balance | Balance | Balance | Balance | Balance | Balance | Balance | Balance | Balance | Balance | Balance | Balance | Balance |
| | Balance | 100 | 100 | 100 | 100 | 100 | 100 | 100 | 100 | 100 | 100 | 100 | 100 | 100 | 100 | 100 | 100 |

| | | Example 41 Ink set 41 | | | | Example 42 Ink set 42 | | | | Example 43 Ink set 43 | | | | Example 44 Ink set 44 | | | |
|---|---|---|---|---|---|---|---|---|---|---|---|---|---|---|---|---|---|
| | Composition | 41Y | 41M | 41C | 41K | 42Y | 42M | 42C | 42K | 43Y | 43M | 43C | 43K | 44Y | 44M | 44C | 44K |
| Colorant | C.I. Pigment Yellow 74 | 8.0 | — | — | — | 8.0 | — | — | — | — | — | — | — | 8.0 | — | — | — |
| | C.I. Pigment Red 122 | — | 8.0 | — | — | — | 8.0 | — | — | — | 8.0 | — | — | — | 8.0 | — | — |

TABLE 1-continued

|  |  | 45Y | 45M | 45C | 45K | 46Y | 46M | 46C | 46K | 47Y | 47M | 47C | 47K | 48Y | 48M | 48C | 48K |
|---|---|---|---|---|---|---|---|---|---|---|---|---|---|---|---|---|---|
|  | C.I. Pigment Blue 15:4 | — | — | 8.0 | — | — | — | 8.0 | — | — | — | 8.0 | — | — | — | 8.0 | — |
|  | C.I. Pigment Black 6 | — | — | — | 8.0 | — | — | — | 8.0 | — | — | — | 8.0 | — | — | — | 8.0 |
| Dispersant | Styrene-acrylic resin | — | — | — | — | — | — | — | — | — | — | — | — | — | — | — | — |
|  | Urethane resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
|  | Fluorene resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| Alcohol | 1,2,6-Hexanetriol | 8 | 8 | 8 | 8 | 8 | 8 | 8 | 8 | 8 | 8 | 8 | 8 | 8 | 8 | 8 | 8 |
| solvent | 1,2-Hexanediol | 1 | 1 | 1 | 1 | 1 | 1 | 1 | 1 | 6 | 6 | 6 | 6 | 6 | 6 | 6 | 6 |
|  | 1,2-Octanediol | 1 | 1 | 1 | 1 | 3 | 3 | 3 | 3 | 1 | 1 | 1 | 1 | 3 | 3 | 3 | 3 |
|  | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
|  | Pure water | Balance | Balance | Balance | Balance | Balance | Balance | Balance | Balance | Balance | Balance | Balance | Balance | Balance | Balance | Balance | Balance |
|  | Balance | 100 | 100 | 100 | 100 | 100 | 100 | 100 | 100 | 100 | 100 | 100 | 100 | 100 | 100 | 100 | 100 |
|  |  | Example 45 Ink set 45 | | | | Example 46 Ink set 46 | | | | Example 47 Ink set 47 | | | | Example 48 Ink set 48 | | | |

|  | Composition | 1Y | 1M | 1C | 1K | 2Y | 2M | 2C | 2K | 3Y | 3M | 3C | 3K | 4Y | 4M | 4C | 4K |
|---|---|---|---|---|---|---|---|---|---|---|---|---|---|---|---|---|---|
| Colorant | C.I. Pigment Yellow 74 | 8.0 | — | — | — | 8.0 | — | — | — | 8.0 | — | — | — | 8.0 | — | — | — |
|  | C.I. Pigment Red 122 | — | 8.0 | — | — | — | 8.0 | — | — | — | 8.0 | — | — | — | 8.0 | — | — |
|  |  | Comparative Example 1 Ink set 1 | | | | Comparative Example 2 Ink set 2 | | | | Comparative Example 3 Ink set 3 | | | | Comparative Example 4 Ink set 4 | | | |

TABLE 1-continued

| Composition | | | | | | | | | | | | | | | |
|---|---|---|---|---|---|---|---|---|---|---|---|---|---|---|---|
| C.I. Pigment Blue 15:4 | — | — | 8.0 | — | — | — | — | — | — | — | — | — | — | — | — |
| C.I. Pigment Black 6 | — | 8.0 | — | — | — | — | 8.0 | — | — | — | — | — | — | 8.0 | 8.0 |
| Dispersant Styrene-acrylic resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| Urethane resin | — | — | — | — | — | — | — | — | — | — | — | — | — | — | — |
| Fluorene resin | — | — | — | — | — | — | — | — | — | — | — | — | — | — | — |
| Alcohol 1,2,6-Hexanetriol | 0 | 0 | 0 | 0 | 0 | 0 | 0 | 3 | 3 | 3 | 3 | 18 | 18 | 18 | 18 |
| solvent 1,2-Hexanediol | 1 | 1 | 1 | 6 | 6 | 6 | 6 | 0 | 0 | 0 | 0 | 0 | 0 | 0 | 0 |
| 1,2-Octanediol | 1 | 1 | 1 | 1 | 3 | 3 | 3 | 1 | 1 | 1 | 1 | 3 | 3 | 3 | 3 |
| Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Pure water | Balance | Balance | Balance | Balance | Balance | Balance | Balance | Balance | Balance | Balance | Balance | Balance | Balance | Balance | Balance |
| | 100 | 100 | 100 | 100 | 100 | 100 | 100 | 100 | 100 | 100 | 100 | 100 | 100 | 100 | 100 |

| Composition | Comparative Example 5 Ink set 5 | | | | Comparative Example 6 Ink set 6 | | | |
|---|---|---|---|---|---|---|---|---|
| | 5Y | 5M | 5C | 5K | 6Y | 6M | 6C | 6K |
| Colorant C.I. Pigment Yellow 74 | 8.0 | — | — | — | 8.0 | — | — | — |
| C.I. Pigment Red 122 | — | 8.0 | — | — | — | 8.0 | — | — |
| C.I. Pigment Blue 15:4 | — | — | 8.0 | — | — | — | 8.0 | — |
| C.I. Pigment Black 6 | — | — | — | 8.0 | — | — | — | 8.0 |
| Dispersant Styrene-acrylic resin | 2.4 | 2.4 | 2.4 | 2.4 | 2.4 | 2.4 | 2.4 | 2.4 |
| Urethane resin | — | — | — | — | — | — | — | — |
| Fluorene resin | — | — | — | — | — | — | — | — |
| Alcohol 1,2,6-Hexanetriol | 3 | 3 | 3 | 3 | 18 | 18 | 18 | 18 |
| solvent 1,2-Hexanediol | 1 | 1 | 1 | 1 | 6 | 6 | 6 | 6 |
| 1,2-Octanediol | 0 | 0 | 0 | 0 | 0 | 0 | 0 | 0 |
| Surfactant | 0.1 | 0.1 | 0.1 | 0.1 | 0.1 | 0.1 | 0.1 | 0.1 |
| Pure water | Balance | Balance | Balance | Balance | Balance | Balance | Balance | Balance |
| | 100 | 100 | 100 | 100 | 100 | 100 | 100 | 100 |

Examples 49 to 60

Ink sets 49 to 60 were prepared in the same manner as in Examples 1 to 12, except that 4-methyl-1,2-pentanediol was used instead of 1,2-hexanediol.

Examples 61 to 72

Ink sets 61 to 72 were prepared in the same manner as in Examples 1 to 12, except that 3,3-dimethyl-1,2-butanediol was used instead of 1,2-hexanediol.

Examples 73 to 144 and Comparative Examples 7 to 12

Ink sets 73 to 144 of Examples 73 to 144 and ink sets 7 to 12 of Comparative Examples 7 to 12 were prepared in the same manner as in Examples 1 to 72 and Comparative Examples 1 to 6, except that the following surfactant was used instead of the surfactant in ink sets of Examples 1 to 72 and Comparative Examples 1 to 6.

A compound of formula (I) wherein R represents a methyl group, a is an integer of 6 to 10, m is an integer of 10 to 20, and n is an integer of 4 to 8 was used as the surfactant in Examples 73 to 144 and Comparative Examples 7 to 12.

Examples 145 to 216 and Comparative Examples 13 to 18

Ink sets 145 to 216 of Examples 145 to 216 and ink sets 13 to 18 of Comparative Examples 13 to 18 were prepared in the same manner as in Examples 1 to 72 and Comparative Examples 1 to 6, except that the following surfactant was used instead of the surfactant in the ink sets of Examples 1 to 72 and Comparative Examples 1 to 6.

A mixture of a compound of formula (I) wherein R represents a hydrogen atom, a is an integer of 7 to 11, m is an integer of 30 to 50, and n is an integer of 3 to 5, a compound of formula (I) wherein R represents a methyl group, a is an integer of 9 to 13, m is an integer of 2 to 4, and n is an integer of 1 or 2, and a compound of formula (I) wherein R represents a methyl group, a is an integer of 6 to 10, m is an integer of 10 to 20, and n is an integer of 4 to 8 was used as the surfactant in Examples 145 to 216 and Comparative Examples 13 to 18.

Examples 217 to 288 and Comparative Examples 19 to 24

Ink sets 217 to 288 of Examples 217 to 288 and ink sets 19 to 24 of Comparative Examples 19 to 24 were prepared in the same manner as in Examples 1 to 72 and Comparative Examples 1 to 6, except that the following surfactant was used instead of the surfactant in the ink sets of Examples 1 to 72 and Comparative Examples 1 to 6.

A compound of formula (I) wherein R represents a methyl group, a is an integer of 6 to 18, m is 0 (zero), and n is 1 was used as the surfactant in Examples 217 to 288 and Comparative Examples 19 to 24.

Examples 289 to 360 and Comparative Examples 25 to 30

Ink sets 289 to 360 of Examples 289 to 360 and ink sets 25 to 30 of Comparative Examples 25 to 30 were prepared in the same manner as in Examples 1 to 72 and Comparative Examples 1 to 6, except that the following surfactant was used instead of the surfactant in the ink sets of Examples 1 to 72 and Comparative Examples 1 to 6.

A mixture of a compound of formula (I) wherein R represents a hydrogen atom, a is an integer of 7 to 11, m is an integer of 30 to 50, and n is an integer of 3 to 5, a compound of formula (I) wherein R represents a methyl group, a is an integer of 9 to 13, m is an integer of 2 to 4, and n is an integer of 1 or 2, and a compound of formula (I) wherein R represents a methyl group, a is an integer of 6 to 18, m is 0 (zero), and n is 1 was used as the surfactant in Examples 289 to 360 and Comparative Examples 25 to 30.

<Evaluation>

Evaluation of Initial Viscosity of Ink

The viscosity was evaluated for the inks thus obtained. The viscosity of the inks was measured one hr after the preparation of the ink with a vibration viscometer (model MV100, manufactured by Yamaichi Electronics Co, Ltd.). The results were evaluated according to the following criteria. The measuring temperature was 20° C.

S: The viscosity was not more than 4 mPa·s.

AA: The viscosity was more than 4 mPa·s and not more than 5 mPa·s.

A: The viscosity was more than 5 mPa·s and not more than 6 mPa·s.

B: The viscosity was more than 6 mPa·s and not more than 7 mPa·s.

C: The viscosity was more than 7 mPa·s and not more than 8 mPa·s.

D: The viscosity was more than 8 mPa·s.

The results of evaluation were as shown in Table 2 below.

Evaluation of Viscosity of Ink After Elapse of Predetermined Period of Time

The inks prepared as described above were allowed to stand for three days under an environment of 70° C. Thereafter, the viscosity of the inks was measured in the same manner as described above. The results were evaluated according to the following criteria.

A: The difference between the initial viscosity and the viscosity after standing was not more than 0.5 mPa·s.

B: The difference between the initial viscosity and the viscosity after standing was more than 0.5 mPa·s and not more than 1.0 mPa·s.

C: The difference between the initial viscosity and the viscosity after standing was more than 1.0 mPa·s and not more than 2.0 mPa·s.

D: The difference between the initial viscosity and the viscosity after standing was more than 2.0 mPa·s.

The results of evaluation were as shown in Table 2 below.

Evaluation of Coagulation Spots and Filling Properties of Inks on Papers Other than Cast Coated Paper The Y, M, C, and K inks obtained above were combined to form ink sets that were installed in an ink cartridge of an ink jet printer (PX-G920, manufactured by SEIKO EPSON CORPORATION) so that recording could be performed at 720 dpi in the main scanning (head driving) direction and at 360 dpi in the subscanning (recording medium conveying) direction. The voltage of the printer was then adjusted so that the size of dots in the impact of ink against the recording medium was about 7 ng. Blotted images at 720×720 dpi were recorded at 720×360 dpi per drive on OKT+ (manufactured by Oji Paper Co., Ltd.) and LPCCT (manufactured by SEIKO EPSON CORPORATION) that had a weight of about 128 g/m². The recording was performed bidirectionally and unidirectionally under an environment of ordinary temperature and ordinary humidity. The coverage of ink was about 3.6 mg/inch².

The images thus obtained were evaluated according to the following criteria.

A: No coagulation spot and no white streak derived from filling failure were observed even in bidirectional printing.

B: No coagulation spot was observed even in bidirectional printing, but white streaks derived from filling failure were observed in bidirectional printing.

C: Coagulation spots were observed in bidirectional printing, and, in unidirectional printing, white streaks derived from filling failure were observed although coagulation spots were not observed.

D: Coagulation spots and white streaks derived from filling failure were observed in unidirectional printing.

The results of evaluation were as shown in Table 2 below.

Recovery from Clogging

The ink cartridge and ink jet printer as described above were provided. An ink replacement button was depressed, and the plug was pulled out. In such a state that the head cap was removed, the printer was allowed to stand in an environment of 40° C. and 15% RH for three days.

After standing for three days, cleaning operation was repeated to determine the number of cleaning operations required for all the nozzles to normally eject the ink as in the initial state. The recovery from nozzle clogging was evaluated according to the following criteria.

A: Recovered to the initial state from nozzle clogging by performing the cleaning operation three times.

B: Recovered to the initial state from nozzle clogging by performing the cleaning operation six times.

C: Recovered to the initial state from nozzle clogging by performing the cleaning operation twelve times.

D: Not recovered to the initial state from nozzle clogging even by performing the cleaning operation twelve times.

The results of evaluation were as shown in Table 2 below.

Evaluation of Coagulation Spots and Filling Properties of Inks on Cast Coated Paper The Y, M, C, and K inks obtained above were combined to form ink sets that were installed in an ink cartridge of an ink jet printer (PX-G920, manufactured by SEIKO EPSON CORPORATION) so that recording could be performed at 720 dpi in the main scanning (head driving) direction and at 360 dpi in the subscanning (recording medium conveying) direction. The voltage of the printer was then adjusted so that the size of dots in the impact of ink against the recording medium was about 7 ng. Blotted images at 720×720 dpi were recorded at 720×360 dpi per drive on Mirror Coat Platinum (manufactured by Oji Paper Co., Ltd.) that had a weight of about 128 g/m$^2$.

The recording was performed bidirectionally and unidirectionally under an environment of ordinary temperature and ordinary humidity. The coverage of ink was about 3.6 mg/inch$^2$.

The images thus obtained were evaluated according to the following criteria.

A: No coagulation spot and no white streak derived from filling failure were observed even in bidirectional printing.

B: No coagulation spot was observed even in bidirectional printing, but white streaks derived from filling failure were observed in bidirectional printing.

C: Coagulation spots were observed in bidirectional printing, and, in unidirectional printing, white streaks derived from filling failure were observed although coagulation spots were not observed.

D: Coagulation spots and white streaks derived from filling failure were observed in unidirectional printing.

The results of evaluation were as shown in Table 2 below.

Evaluation of Collapse of Characters of Small Font Sizes

The Y, M, C, and K inks obtained above were combined to form ink sets that were installed in an ink cartridge of an ink jet printer (PX-G920, manufactured by SEIKO EPSON CORPORATION) so that recording could be performed at 720 dpi in the main scanning (head driving) direction and at 360 dpi in the subscanning (recording medium conveying) direction. The voltage of the printer was then adjusted so that the size of dots in the impact of ink against the recording medium was about 7 ng under an environment of ordinary temperature and ordinary humidity. The coverage of the ink was about 3.6 mg/inch$^2$ when blotted images at 720×720 dpi were recorded at 720×360 dpi per drive. Under the above conditions, Japanese kanji characters "薔薇" which means rose in English were printed unidirectionally at a font size of 8 points and a font size of 12 points on OKT+ (manufactured by Oji Paper Co., Ltd.) that had a weight of about 128 g/m$^2$.

The printed characters were evaluated according to the following criteria.

A: The kanji characters "薔薇" at a font size of 8 points could easily be recognized.

B: The kanji characters "薔薇" at a font size of 8 points could not easily be recognized although the kanji characters "薔薇" at a font size of 12 points could easily be recognized.

C: The kanji characters "薔薇" at a font size of 12 points could not easily be recognized.

The results of evaluation were as shown in Table 2 below.

TABLE 2

|  | Ink viscosity | | Ink coagulation | Anti- |
|---|---|---|---|---|
|  | Initial viscosity | Viscosity after standing | spots and filling property | clogging property |
| Example 1 | B | C | C | C |
| Example 2 | D | D | B | C |
| Example 3 | C | D | C | C |
| Example 4 | D | D | B | C |
| Example 5 | B | C | C | C |
| Example 6 | D | D | B | C |
| Example 7 | D | D | C | C |
| Example 8 | D | D | A | C |
| Example 9 | D | C | C | B |
| Example 10 | D | D | A | B |
| Example 11 | D | D | B | B |
| Example 12 | D | D | A | B |
| Example 13 | S | B | C | C |
| Example 14 | A | C | B | C |
| Example 15 | AA | B | C | C |
| Example 16 | B | C | B | C |
| Example 17 | AA | B | C | B |
| Example 18 | B | C | B | B |
| Example 19 | A | B | C | B |
| Example 20 | C | C | A | B |
| Example 21 | A | B | C | A |
| Example 22 | C | C | A | A |
| Example 23 | B | B | B | A |
| Example 24 | D | C | A | A |
| Example 25 | S | A | C | C |
| Example 26 | A | A | B | C |
| Example 27 | AA | A | C | C |
| Example 28 | B | B | B | C |
| Example 29 | AA | A | C | A |
| Example 30 | B | A | B | A |
| Example 31 | A | A | C | A |
| Example 32 | C | B | A | A |
| Example 33 | A | A | C | A |
| Example 34 | C | A | A | A |
| Example 35 | B | A | B | A |
| Example 36 | D | B | A | A |
| Example 37 | S | A | C | B |
| Example 38 | A | A | B | B |
| Example 39 | AA | A | C | B |
| Example 40 | B | A | B | B |
| Example 41 | AA | A | C | A |
| Example 42 | B | A | B | A |
| Example 43 | A | A | C | A |
| Example 44 | C | A | A | A |
| Example 45 | A | A | C | A |
| Example 46 | C | A | A | A |
| Example 47 | B | A | B | A |
| Example 48 | D | A | A | A |
| Comparative | B | C | D | D |

TABLE 2-continued

| | Ink viscosity | | Ink coagulation | Anti- |
|---|---|---|---|---|
| | Initial viscosity | Viscosity after standing | spots and filling property | clogging property |
| Example 1 Comparative Example 2 | D | D | D | D |
| Comparative Example 3 | B | D | D | C |
| Comparative Example 4 | D | D | D | B |
| Comparative Example 5 | B | C | D | C |
| Comparative Example 6 | D | C | D | B |

For Examples 49 to 60 and 61 to 72, the results of evaluation were similar to the results of evaluation for Examples 1 to 12.

For Examples 73 to 144 and Comparative Examples 7 to 12, the evaluation as described above was carried out. As a result, it was found that the evaluation of ink coagulation spots and the evaluation of filling property on the cast coated paper were improved by one rank. The evaluation of collapse of characters of small font sizes, however, was lowered by two ranks. These results were the same as those for Examples 1 to 72 and Comparative Examples 1 to 6.

For Examples 145 to 216 and Comparative Examples 13 to 18, the evaluation as described above was carried out. As a result, it was found that the evaluation of ink coagulation spots and the evaluation of filling property on the cast coated paper were improved by one rank. The evaluation of collapse of characters of small font sizes, however, was lowered by one rank. These results were the same as those for Examples 1 to 72 and Comparative Examples 1 to 6.

For Examples 217 to 288 and Comparative Examples 19 to 24, the evaluation as described above was carried out. As a result, it was found that the evaluation of ink coagulation spots and the evaluation of filling property on the cast coated paper were improved by one rank. The evaluation of collapse of characters of small font sizes, however, was lowered by one rank. These results were the same as those for Examples 1 to 72 and Comparative Examples 1 to 6.

For Examples 289 to 360 and Comparative Examples 25 to 30, the evaluation as described above was carried out. As a result, it was found that the evaluation of ink coagulation spots and the evaluation of filling property on the cast coated paper were improved by one rank. The evaluation of collapse of characters of small font sizes, however, was lowered by one rank. These results were the same as those for Examples 1 to 72 and Comparative Examples 1 to 6.

The invention claimed is:

1. An ink composition for ink jet recording, comprising at least a colorant, water, an alcohol solvent, and a surfactant, wherein the alcohol solvent comprises a sparingly water soluble alkanediol, a water soluble alkanediol, and a water soluble alkanetriol, the solubility of the sparingly water soluble alkanediol in water is less than 1.0 g/100 g of water, the solubility of the water soluble alkanediol in water is not less than 10.0 g/100 g of water and the solubility of the water soluble alkanetriol in water is not less than 10.0 g/100 g of water.

2. The ink composition for ink jet recording according to claim 1, wherein the sparingly water soluble alkanediol is an alkanediol having 7 or more carbon atoms.

3. The ink composition for ink jet recording according to claim 1, wherein the water soluble alkanediol is an alkanediol having 6 or less carbon atoms.

4. The ink composition for ink jet recording according to claim 1, wherein the water soluble alkanetriol is an alkanetriol of which the main chain has 5 or more carbon atoms.

5. The ink composition for ink jet recording according to claim 1, wherein the content ratio of the sparingly water soluble alkanediol to the water soluble alkanediol is 1:1 to 1:6.

6. The ink composition for ink jet recording according to claim 1, wherein the content ratio of the sparingly water soluble alkanediol to the water soluble alkanetriol is 1:1 to 1:6.

7. The ink composition for ink jet recording according to claim 1, wherein the total of the content of the sparingly water soluble alkanediol and the content of the water soluble alkanediol is not more than 9% by weight based on the ink composition.

8. The ink composition for ink jet recording according to claim 1, wherein the total of the content of the sparingly water soluble alkanediol and the content of the water soluble alkanetriol is not more than 21% by weight based on the ink composition.

9. The ink composition for ink jet recording according to claim 1, wherein the sparingly water soluble alkanediol is contained in an amount of 1 to 3% by weight based on the ink composition.

10. The ink composition for ink jet recording according to claim 1, wherein the water soluble alkanediol is contained in an amount of 1 to 6% by weight based on the ink composition.

11. The ink composition for ink jet recording according to claim 1, wherein the water soluble alkanetriol is contained in an amount of 3 to 18% by weight based on the ink composition.

12. The ink composition for ink jet recording according to claim 1, wherein the sparingly water soluble alkanediol is 1,2-octanediol.

13. The ink composition for ink jet recording according to claim 1, wherein the water soluble alkanediol is one or more alkanediols selected from the group consisting of 1,2-hexanediol, 4-methyl-1,2-pentanediol, and 3,3-dimethyl-1,2-butanediol.

14. The ink composition for ink jet recording according to claim 1, wherein the water soluble alkanetriol is one or more alkanetriols selected from the group consisting of 1,2,6-hexanetriol and 3-methylpentane-1,3,5-triol.

15. The ink composition for ink jet recording according to claim 1, wherein the surfactant is contained in an amount of 0.01 to 1.0% by weight based on the ink composition.

16. The ink composition for ink jet recording according to claim 15, wherein the surfactant is a polyorganosiloxane surfactant.

17. The ink composition for ink jet recording according to claim 16, wherein the polyorganosiloxane comprises one or at least two compounds represented by the following formula:

[Chemical formula 1]

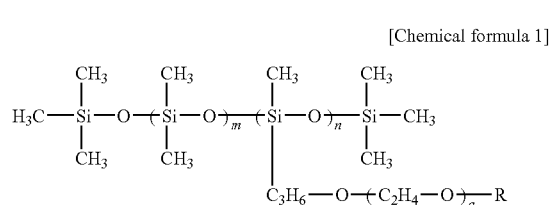

wherein R represents a hydrogen atom or a methyl group; a is an integer of 2 to 11; m is an integer of 2 to 50; and n is an integer of 1 to 5.

18. The ink composition for ink jet recording according to claim 16, wherein the polyorganosiloxane comprises one or at least two compounds represented by the following formula:

[Chemical formula 2]

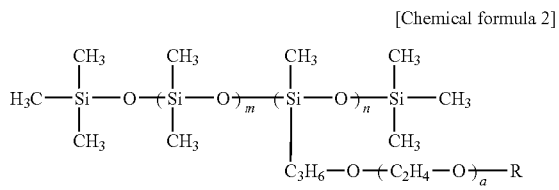

wherein R represents a hydrogen atom or a methyl group; a is an integer of 2 to 13; m is an integer of 2 to 50; and n is an integer of 1 to 5.

19. The ink composition for ink jet recording according to claim 16, wherein the polyorganosiloxane comprises one or at least two compounds represented by the following formula:

[Chemical formula 3]

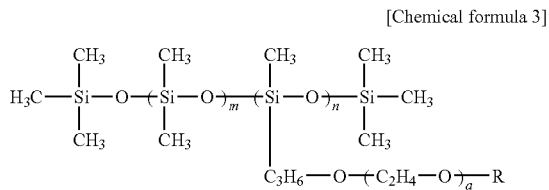

wherein R represents a hydrogen atom or a methyl group; a is an integer of 2 to 13; m is an integer of 2 to 50; and n is an integer of 1 to 8.

20. The ink composition for ink jet recording according to claim 16, wherein the polyorganosiloxane comprises one or at least two compounds represented by the following formula:

[Chemical formula 4]

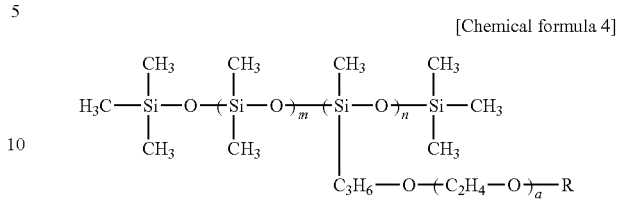

wherein R represents a methyl group; a is an integer of 6 to 18; m is 0 (zero); and n is 1.

21. The ink composition for ink jet recording according to claim 1, wherein the colorant comprises a pigment and a dispersant that can disperse the pigment in the ink.

22. The ink composition for ink jet recording according to claim 21, wherein the dispersant comprises at least one resin selected from the group consisting of styrene-acrylic acid copolymer resins, urethane resins, and fluorene resins.

23. The ink composition for ink jet recording according to claim 22, wherein the dispersant is contained in an amount of 1.0 to 6.0% by weight based on the ink composition.

24. A method for ink jet recording, comprising ejecting droplets of an ink composition and depositing the droplets onto a recording medium to perform printing, wherein the ink composition is an ink composition for ink jet recording according to claim 1.

25. The method according to claim 24, wherein the recording medium is a synthetic paper produced using a synthetic resin as a main raw material, or a printing paper for running-on.

26. A recorded matter recorded by a method for ink jet recording according to claim 1.

* * * * *